United States Patent
Kuno et al.

(10) Patent No.: US 8,178,996 B2
(45) Date of Patent: May 15, 2012

(54) POWER SUPPLY UNIT HAVING CONFIGURABLE OUTPUT VOLTAGE RANGES

(75) Inventors: Ryotaro Kuno, Ichinomiya (JP); Toru Itabashi, Anjo (JP)

(73) Assignee: Denso Corporation, Kariya (JP)

( * ) Notice: Subject to any disclaimer, the term of this patent is extended or adjusted under 35 U.S.C. 154(b) by 319 days.

(21) Appl. No.: 12/535,143

(22) Filed: Aug. 4, 2009

(65) Prior Publication Data
US 2010/0026265 A1 Feb. 4, 2010

(30) Foreign Application Priority Data

Aug. 4, 2008 (JP) ................................. 2008-200988

(51) Int. Cl.
*H02J 3/00* (2006.01)
(52) U.S. Cl. .......................................... 307/28; 307/80
(58) Field of Classification Search ............... 307/28.39, 307/80, 82, 87
See application file for complete search history.

(56) References Cited

U.S. PATENT DOCUMENTS

| 6,147,477 | A | 11/2000 | Saeki et al. |
| 6,225,708 | B1 * | 5/2001 | Furukawa et al. ............... 307/66 |
| 2004/0108842 | A1 | 6/2004 | Oyama et al. |
| 2005/0206323 | A1 | 9/2005 | Hayakawa et al. |

FOREIGN PATENT DOCUMENTS

| JP | 09-154275 | 6/1997 |
| JP | 11-041825 | 2/1999 |
| JP | 2001-092542 | 4/2001 |
| JP | 2003-316482 | 11/2003 |
| JP | 2004-140944 | 5/2004 |
| JP | 2004-147437 | 5/2004 |
| JP | 2005-269829 | 9/2005 |
| JP | 2006-115596 | 4/2006 |

\* cited by examiner

*Primary Examiner* — Shawn Riley
(74) *Attorney, Agent, or Firm* — Nixon & Vanerhye P.C.

(57) ABSTRACT

As a result of a path being connected to an input terminal to allow a first intermediate voltage from a power-side regulator or another external source that does not pass through the power-side regulator to be selectively inputted into any supply-side regulator, a supply voltage can be generated based on the inputted voltage. Therefore, as a result of the relevant supply-side regulator being connected to a path by which the other external source is inputted, a supply voltage having a voltage value differing from that when the first intermediate voltage is inputted can be generated. As a result of the voltage inputted into the supply-side regulator being changed, only the voltage value of the supply voltage generated by the supply-side regulator is changed. Therefore, the variation of the voltage value of the supply voltage that can be provided by a power supply unit can be changed.

18 Claims, 9 Drawing Sheets

POWER SUPPLY UNIT HAVING CONFIGURABLE OUTPUT VOLTAGE RANGES

CROSS-REFERENCE TO RELATED APPLICATION

This application is related to Japanese Patent Application NO. 2008-200988 filed on Aug. 4, 2008, the contents of which are hereby incorporated by reference.

BACKGROUND OF THE INVENTION

1. Field of the Invention

The present invention relates generally to power supply units, and in particular, to a power supply unit which is capable of supplying power with a plurality of output voltage ranges. More particularity, the power supply unit includes a power-side regulator and one or more supply-side regulators. The power-side regulator generates a first intermediate voltage that is stepped-down from a power supply source. The supply-side regulator generates a power generated from the first intermediate voltage that has been stepped-down. The power supply unit is configured to supply the power to a controlled object.

2. Description of the Related Art

As a conventional power supply unit such as that described above, a device is disclosed in Japanese Patent Laid-open Publication No. 2004-147437 that is configured to generate a plurality of types of supply voltages to be supplied to a controlled object, depending on the combination of a power-side regulator and a supply-side regulator.

However, in the above-described configuration, the types of supply voltages that are ultimately generated, specifically a voltage range of each supply voltage, is determined depending on respective characteristics of the power-side regulator and the supply-side regulator. Therefore, no problems arise when the controlled object only requires the voltage range which is determined depending on the respective characteristics of the power-side regulator and the supply-side regulator. However, if the controlled object requires a supply voltage that exceeds the above voltage range, the power supply unit configured by the power-side regulator and the supply-side regulator cannot be used.

In such instances, a dedicated power supply unit that adapts an alternative voltage range necessary for the controlled object is newly developed. However, the cost of designing and manufacturing the dedicated power supply unit increases the final manufacturing cost of the controlled object.

SUMMARY OF THE INVENTION

The present invention has been achieved to solve the above-described issues. An object of the present invention is to facilitate a configuration of a supply voltage range that can be generated by a single power supply unit.

To solve the above-described issues, a first configuration of the invention is a power supply unit including a power-side regulator and one or more supply-side regulators. The power-side regulator generates a first intermediate voltage that is a power supply voltage provided from an external source, the power supply voltage having been stepped-down. Each supply-side regulator generates a supply voltage that is the first intermediate voltage that has been stepped-down. The power supply unit supplies a controlled object with respective supply voltage generated by the supply-side regulators.

In the configuration, at least one of the supply-side regulators is configured to allow selective connection to either a path over which the first intermediate voltage is inputted from the power-side regulator or a path that does not pass through the power-side regulator and allows input of another external source. The supply voltage is generated based on the voltage inputted from the selectively connected path.

In a power supply unit configured as described above, a path is connected to at least one of the supply-side regulators such that the first intermediate voltage from the power-side regulator or the other external source that does not pass through the power-side regulator is selectively inputted. As a result, the supply voltage can be generated based on the inputted source.

Therefore, as a result of the path inputting the other external source being connected to a relevant supply-side regulator, a supply voltage having a voltage value differing from that when the first intermediate voltage is inputted can be generated.

As a result of the source inputted into the relevant supply-side regulator being changed from the first intermediate voltage to the external source, only the voltage value of the supply voltage generated by the supply-side regulator is changed. Therefore, the power supply unit can be configured to include an alternative supply voltage range in such a manner.

The change described above can be easily produced by selectively connecting either the path from the power-side regulator or the path that does not pass through the power-side regulator to the relevant supply-side regulator, depending on the voltage value required by the controlled object.

Here, for example, when the controlled object can be controlled by just the supply voltage determined by the respective characteristics of the power-side regulator and the supply-side regulators, all supply-side regulators are merely required to be connected to the path from the power-side regulator.

On the other hand, when the controlled object requires a supply voltage having a different voltage value in addition to the supply voltage determined by the respective characteristics of the power-side regulator and the supply-side regulators, any of the supply-side regulators is connected to the path that does not pass through power-side regulator and, in addition, the external source is inputted from the path, the external source having a voltage value allowing the "voltage value that differs" to be generated in relation to the characteristics of the supply-side regulator.

Specifically, for example, an auxiliary regulator is additionally provided that generates a second intermediate voltage that is the power supply voltage that has been stepped-down (a voltage value differs from that of the first intermediate voltage). The second intermediate voltage generated in this way is inputted into the supply-side regulator as the external source.

In this way, because a modified voltage required to control the controlled object can be generated, a dedicated power supply unit is not required. As a result, an increase in the final manufacturing cost of the controlled object, including design and manufacturing, can be prevented. Such cost-related advantages are particularly significant in small-scale manufacturing of multiple types of mounting objects.

In the above-described configuration, a configuration is preferred in which abnormal supply voltages are prevented from being provided to the controlled object, by the regulator stopping voltage generation when an abnormal operation is detected in each regulator.

To achieve the above-described configuration, a first abnormality detecting section that detects an abnormal operation of the power-side regulator can be provided. When the first abnormality detecting section detects the abnormal operation, the power-side regulator stops generating the first intermediate voltage.

In the configuration, when an abnormal operation occurs in the power-side regulator, generation of the first intermediate voltage by the power-side regulator can be stopped. As a result, the supply-side regulator can be prevented from generating an abnormal supply voltage and supplying the abnormal supply voltage to the controlled object.

There are many possible configurations for stopping generation of the intermediate voltage. However, for example, when a soft-start capacitor connected to the power-side regulator to soft-start the operation of the power-side regulator is provided, a following third configuration can be used.

In the configuration, when the first abnormality detecting section detects an abnormal operation, the soft-start capacitor is discharged. As a result, the power-side regulator stops operation of the power-side regulator itself and stops generating the first intermediate voltage.

In the configuration, the generation of first intermediate voltages by the power-side regulator can be stopped merely by the soft-start capacitor being diverted and discharged.

In a configuration using the soft-start capacitor such as this, when an auxiliary regulator is additionally provided as described above and the auxiliary regulator also uses the soft-start capacitor, a following fourth configuration is preferably used.

In the configuration, an instance is assumed in which an auxiliary power supply unit is provided. The auxiliary power supply unit includes an auxiliary regulator and a second abnormality detecting section. The auxiliary regulator generates a second intermediate voltage that is the power supply voltage stepped-down to a voltage value differing from that of the first intermediate voltage. The second abnormality detecting section detects an abnormal operation of the auxiliary regulator. The auxiliary power supply unit is configured such that, when the second abnormality detecting section detects an abnormal operation, a soft-start capacitor provided to soft-start the operation of the auxiliary regulator is discharged. As a result, the auxiliary regulator stops operation. The soft-start capacitor is connected in parallel to the power-side regulator and the auxiliary regulator in the auxiliary power supply unit to soft-start the operation of the auxiliary regulator in addition to the operation of the power-side regulator.

In the configuration, the soft-start capacitor provided for the power-side regulator can also be used as the soft-start capacitor of the auxiliary regulator in the auxiliary power supply unit. Therefore, the number of soft-start capacitors can be reduced.

As a result of the soft-start capacitor being discharged, the generation of second intermediate voltages by the auxiliary regulator of the auxiliary power supply unit can be stopped simultaneously with the generation of first intermediate voltages by the power-side regulator.

As a result, an abnormal operation of a regulator on one side can be detected by the regulator on the other side, and the generation of intermediate voltages can be stopped. From the perspective of the regulator on one side, discharge of the soft-start capacitor Cs in a state in which an abnormal operation of the regulator itself is not detected can be considered to be caused by an abnormal operation of the regulator on the other side.

In this way, the power-side regulator can detect the occurrence of an abnormal operation in the auxiliary regulator of the auxiliary power supply unit from a discharge state of the soft-start capacitor. Therefore, a path for giving notification of an abnormal operation from the auxiliary regulator side is not required to be provided. As a result, an effect can be achieved in which the number of paths and terminals between the power supply unit and the auxiliary power supply unit can be reduced.

In the configuration such as that described above in which the generation of first intermediate voltages is stopped when an abnormal operation is detected, the power-side regulator can resume generation of the first intermediate voltages after the abnormal operation is no longer detected.

In each of the above-described configurations, when a reset output section is provided that outputs a reset signal for resetting an operation of the controlled object to the controlled object to which the supply voltage is supplied, while the first abnormality detecting section is detecting an abnormal operation, a following fifth configuration can be used.

In the configuration, the power-side regulator resumes generating the first intermediate voltage after elapse of a predetermined amount of time required to reset the operation of the controlled object after the first abnormality detecting section stops detecting the abnormal operation.

In the configuration, the generation of first intermediate voltages is not resumed until the elapse of the predetermined amount of time required to reset the operation of the controlled object, even when the abnormal operation is no longer detected. As a result, even when an abnormal operation occurs for only a period of time shorter than the amount of time required to reset the operation of the controlled object, the generation of first intermediate voltages is resumed after elapse of the required amount of time. Therefore, the supply of the first intermediate voltages to the supply-side regulators can be resumed after the operation of the controlled object has been reliably reset.

In the configuration, whether the "amount of time required to reset the operation of the controlled object" has elapsed can be determined by a counter value of a timer that counts the time elapsed after detection of the abnormal operation.

When an abnormal operation in each regulator is detected, to stop the generation of voltages by the regulators and prevent abnormal supply voltages from being provided to the controlled subject, the generation of supply voltages by the supply-side regulators can be stopped individually when abnormal operations occur.

To achieve the above-described configuration, a first abnormality detecting section that detects an abnormal operation of the power-side regulator can be provided. When the first abnormality detecting section detects the abnormal operation, at least one of the supply-side regulators stops generating the supply voltage.

In this configuration, when an abnormal operation of the power-side regulator occurs, the generation of supply voltages by the supply-side regulators provided further downstream can be stopped. As a result, abnormal supply voltages are promptly prevented from being generated and supplied to the controlled object.

In the configuration, the supply-side regulator that stops generating the supply voltages can be any of the supply-side regulators. For examples the supply-side regulator can be one or more regulators determined depending on the importance of the function provided by the controlled subject and actualized by the supply voltage. Alternatively, the supply-side regulator can be all regulators regardless of importance.

When the auxiliary regulator is added as described above, an abnormal operation of the auxiliary regulator is preferably also detected with the abnormal operation on the power supply unit side to reduce the number of components and cut manufacturing costs.

Therefore, for example, a configuration can be considered in which the power-side regulator stops generating the first intermediate voltages or the supply-side regulator stops generating the supply voltages when an abnormal operation of the auxiliary regulator occurs.

As a configuration for achieving the latter, an instance is assumed in which an auxiliary power supply unit can be provided. The auxiliary power supply unit includes an auxiliary regulator and a second abnormality detecting section. The auxiliary regulator generates a second intermediate voltage that is the power supply voltage stepped-down to a voltage value differing from that of the first intermediate voltage. The second abnormality detecting section detects an abnormal operation of the auxiliary regulator. When a detection signal inputted from at least either of a first detection path and a second detection path indicates a detection result that an abnormal operation has been detected, at least any of the supply-side regulators stops generating the supply voltage. The first detection path inputs a detection signal from the first abnormality detecting section. The second detection path inputs a detection signal from the second abnormality detecting section of the auxiliary power supply unit.

In the configuration, when an abnormal operation of the auxiliary regulator occurs, the generation of supply voltages by a supply-side regulator provided furthest downstream can be stopped. As a result, abnormal supply voltages can be promptly prevented from being generated and supplied to the controlled object.

A specific configuration for detecting an abnormal operation of the power-side regulator, described above, is not particularly limited. However, the following seventh to eleventh configurations can be considered.

First, in an eighth configuration, the first abnormality detecting section is configured as a detection circuit that detects an abnormal operation of the power-side regulator by a temperature rise accompanying the generation of the first intermediate voltage by the power-side regulator exceeding a predetermined threshold value.

In the configuration, the abnormal operation of the power-side regulator can be detected based on the temperature rise in the power-side regulator.

Next, in a ninth configuration, the first abnormality detecting section is configured as a detection circuit that detects an abnormal operation of the power-side regulator by a voltage value of the first intermediate voltage generated by the power-side regulator becoming greater than a predetermined threshold value.

In this configuration, the abnormal operation of the power-side regulator can be detected based on an output voltage of the power-side regulator.

In a tenth configuration, the first abnormality detecting section is configured as a detection circuit that detects abnormal operation of the supply-side regulator by a current value of the first intermediate voltage generated by the power-side regulator becoming greater than a predetermined threshold value.

In this configuration, abnormal operation of the supply-side regulator can be detected based on an output current of the power-side regulator.

In an eleventh configuration, the first abnormality detecting section is configured as a detection circuit that detects an abnormal operation of the power-side regulator or the supply-side regulators by at least any of a temperature rise accompanying the generation of the first intermediate voltage by the power-side regulator exceeding a predetermined threshold value, a voltage value of the first intermediate voltage generated by the power-side regulator becoming greater than a predetermined threshold value, and a current value of the first intermediate voltage generated by the power-side regulator becoming greater than a predetermined threshold value.

In the configuration, the abnormal operation of the power-side regulator or the supply-side regulators can be detected based on any of the temperature rise in the power-side regulator, the voltage value of the first intermediate voltage, and the current value of the first intermediate voltage.

As described above, in a configuration in which the generation of supply voltages is stopped when an abnormal operation is detected, the supply-side regulators can resume generating the supply voltages after the abnormal operation is no longer detected.

More specifically, a reset output section is provided that outputs a reset signal for resetting an operation of the controlled object being supplied the supply voltage, while the first abnormality detecting section is detecting an abnormal operation. When the reset output section provided, a following twelfth configuration can be used.

In this configuration, each supply-side regulator resumes generating the supply voltages after elapse of a predetermined amount of time required to reset the operation of the controlled object after the first abnormality detecting section stops detecting the abnormal operation.

In the configuration, the generation of supply voltages is not resumed until the elapse of the predetermined amount of time required to reset the operation of the controlled object, even when the abnormal operation is no longer detected. As a result, even when an abnormal operation occurs for only a period of time shorter than the amount of time required to reset the operation of the controlled object, the generation of supply voltages is resumed after elapse of the required amount of time. Therefore, the supply of the supply voltages to the controlled object can be resumed after the operation of the controlled object has been reset with certainty.

In each of the above-described configurations, a voltage adjusting section can be provided that receives an instruction from an external device and adjusts a voltage value of a supply voltage generated by each supply-side regulator, as in a thirteenth configuration.

In the configuration, the voltage value of the supply voltages generated by each supply-side regulator can be adjusted within a range determined in relation to the voltage value of the first intermediate voltage.

DETAILED DESCRIPTION OF THE PREFERRED EMBODIMENTS

Preferred embodiments of the present invention will be described with reference to the attached drawings FIGS. 1 to 9.

First Embodiment

Figure 1:
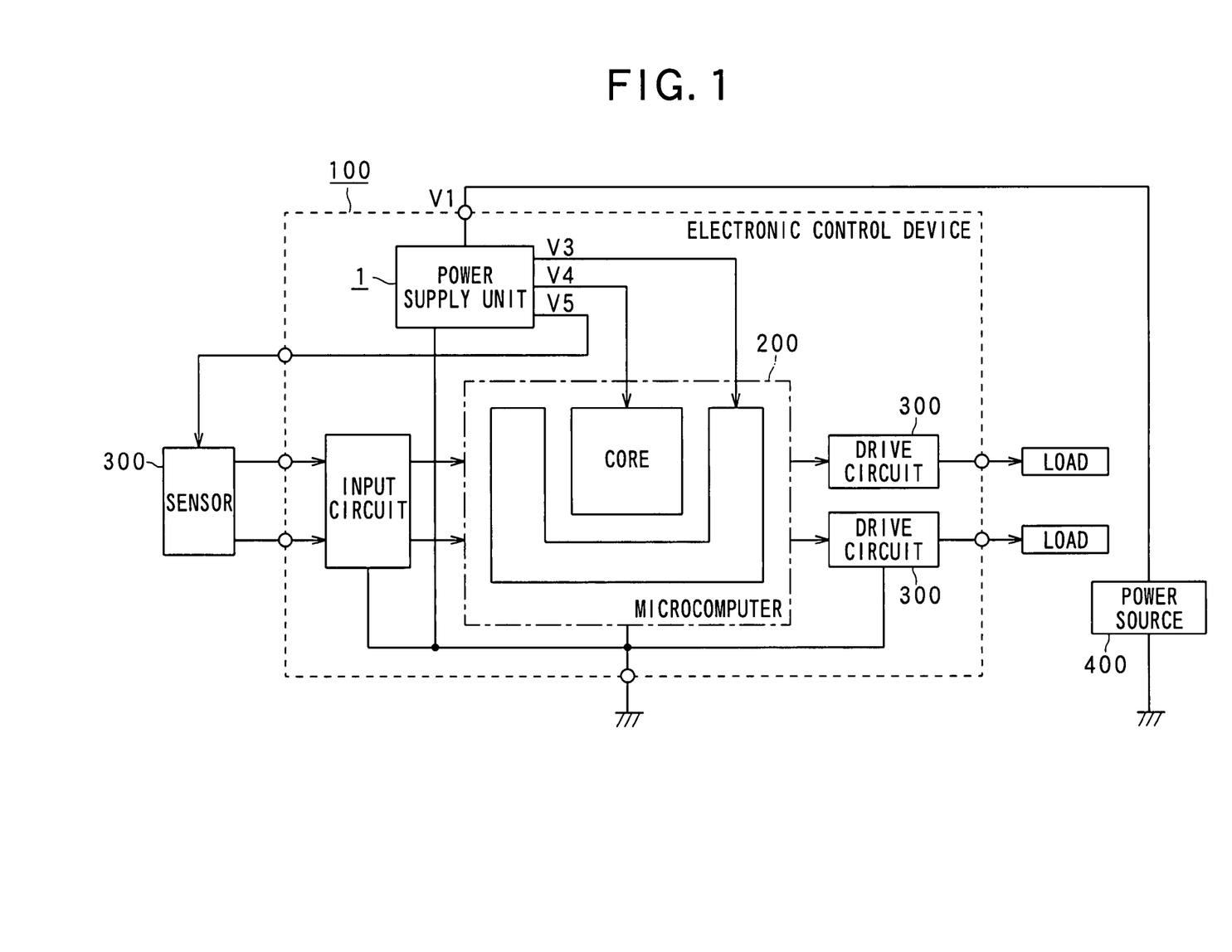
FIG. 1 is a block diagram showing a configuration of an electronic control device onto which a power supply unit is mounted.

Overall Configuration of the present invention is described with reference to FIG. 1. As shown in FIG. 1, a power supply unit 1 is mounted on a main body of an electronic control device 100 as a device that supplies power to the electronic control device 100. The power supply unit 1 is configured to generate and regulates a plurality of types of voltages required by a microcomputer 200 and various sensors (sensors, drive circuits, and the like) 300 in the electronic control device 100. The microcomputer 200 and sensors 300 corresponds to an object device.

Figure 2:
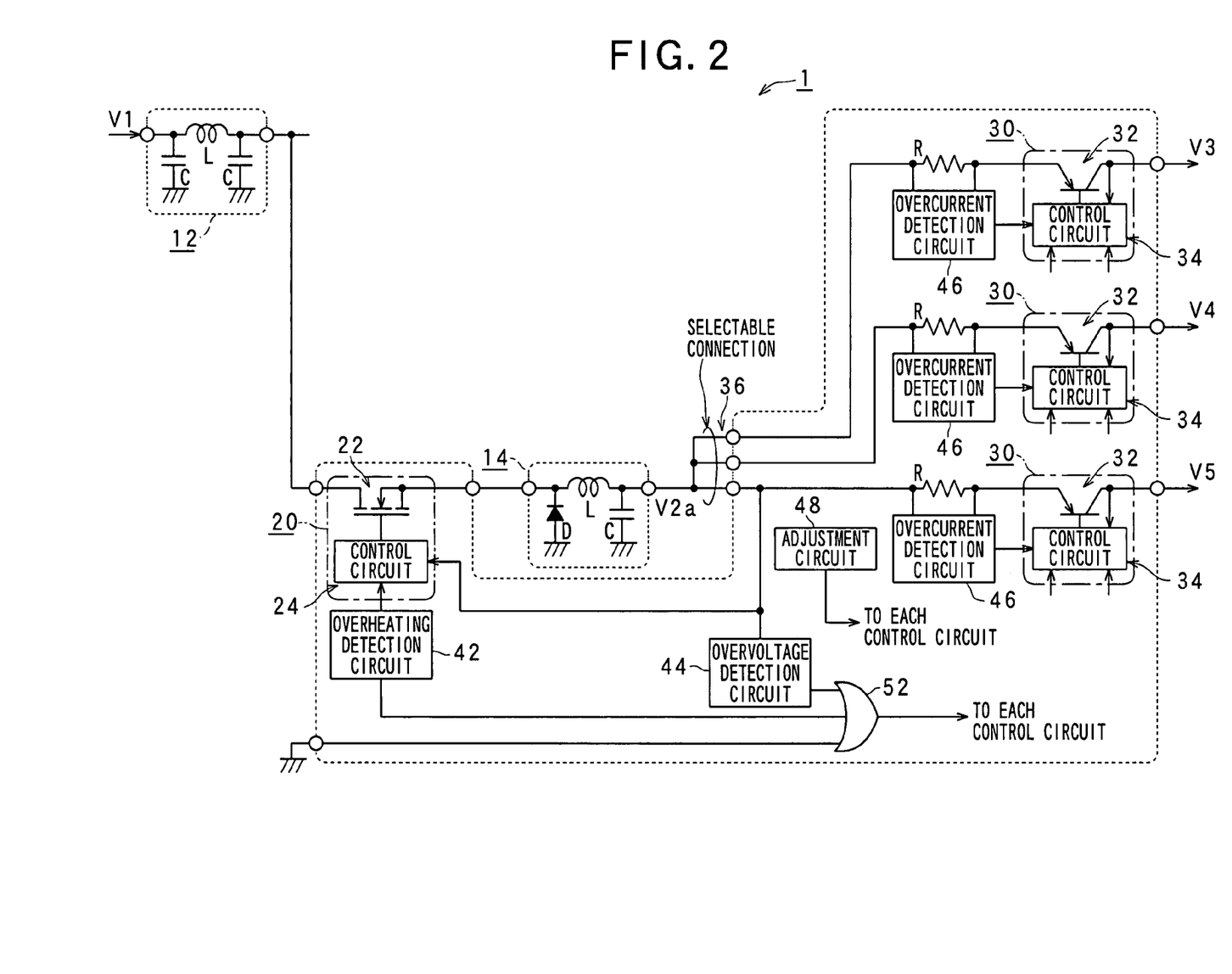
FIG. 2 is a block diagram (1/2) showing a configuration of the power supply unit (first embodiment)

As shown in FIG. 2, the power supply unit 1 includes an input filter 12 (referred to filter circuit), a power-side regulator 20 (referred to first regulator), a smoothing circuit 14, one or more supply-side regulators 30 (referred to second regulator) which is three in number according to the embodiment, an overheating detection circuit 42, an overvoltage detection circuit 44, an overcurrent detection circuit 46, an adjustment circuit 48, and the like. A power supply voltage (voltage V1) provided by a power source 400 is inputted into the input filter 12. The power-side regulator 20 generates a first intermediate voltage (referred to first voltage) that is the power supply voltage from which noise has been removed by the input filter 12 and that has been stepped-down. The smoothing circuit 14 smoothes a voltage ripple in the first intermediate voltage generated as described above. Each supply-side regulator 30 generates supply voltages that are the first intermediate voltage that has been smoothed by the smoothing circuit 14 and stepped-down. The overheating detection circuit 42 detects a temperature of the power-side regulator 20. The overvoltage detection circuit 44 detects a voltage value of the first intermediate voltage smoothed by the smoothing circuit 14. The overcurrent detection circuit 46 detects a current value of the first intermediate voltage. An overcurrent detection circuit 46 is interposed between the smoothing circuit 14 and each supply-side regulator 30. The adjustment circuit 48 adjusts the voltage value of the supply voltages generated by each supply-side regulator 30. The power supply unit 1 is configured to supply respective supply voltages generated by the supply-side regulators 30.

Excluding the input filter 12 and the smoothing circuit 14, the other constituent elements described above are mounted as a single integrated chip (IC).

The power-side regulator 20 is a switching regulator including a metal-oxide-semiconductor field-effect transistor (MOSFET) 22 and a control circuit 24 for controlling switching of the MOSFET 22. The voltage V1 of the power supply voltage is stepped-down to a midpoint potential V2a by a switching operation of the MOSFET 22. The stepped-down voltage is outputted as the first intermediate voltage.

The supply-side regulator 30 is a series regulator including a bipolar transistor 32 and a control circuit 34 for controlling the bipolar transistor 32. Each supply-side regulator 30 steps down the voltage V2a of the first intermediate voltage to a predetermined potential V3 to Vn (n is an arbitrary integer; n=5 according to the embodiment) by a regulation operation of the bipolar transistor 32. The stepped-down voltage is outputted as the supply voltage.

Each supply-side regulator 30 is configured such that the first intermediate voltage is inputted externally via an input terminal 36. Therefore, a path connecting to the input terminal 36 can be selectively connected not only to a path that passes through the power-side regulator 20 and the smoothing circuit 14 (referred to first path), but also to a path that does not pass through the power-side regulator 20 (referred to a second path). In this instance, the supply-side regulator 30 connected to the path that does not pass through the power-side regulator 20 generates the supply voltage based on an external source inputted from the path.

The overheating detection circuit 42 monitors the peripheral temperature of the power-side regulator 20. When the overheating detection circuit 42 detects that the temperature has exceeded a maximum temperature that can be reached during normal operation, the overheating detection circuit 42 outputs a notification signal (a High-level signal, according to the embodiment) giving notification that the power-side regulator 20 is operating abnormally. The notification signal is outputted to the control circuit 34 of each supply-side regulator 30 via an OR circuit 52. Each control circuit 34 that receives the notification signal stops the regulation operation of the bipolar transistor 32, thereby stopping the generation of supply voltages as the supply-side regulator 30.

The overheating detection circuit 42 also outputs the notification signal to the control circuit 24 of the power-side regulator 20. The control circuit 24 that has received the notification signal stops the switching operation of the MOSFET 22, thereby stopping the generation of supply voltages as the power-side regulator 20.

The overvoltage detection circuit 44 monitors the voltage value of the first intermediate voltage smoothed by the smoothing circuit 14. When the overvoltage detection circuit 44 detects that the voltage value has exceeded a maximum value that can be reached while the power-side regulator 20 is operating normally, the overvoltage detection circuit 44 outputs a notification signal (a High-level signal, according to the embodiment) giving notification that the power-side regulator 20 is operating abnormally. The notification signal is outputted to the control circuit 34 of each supply-side regulator 30 via an OR circuit 52, in a manner similar to that described above. The control circuit 34 that has received the notification signal stops the regulation operation of the bipolar transistor 32, thereby stopping the generation of supply voltages as the supply-side regulator 30.

The overvoltage detection circuit 44 also outputs the notification signal to the control circuit 24 of the power-side regulator 20. The control circuit 24 that has received the notification signal stops the switching operation of the MOSFET 22, thereby stopping the generation of supply voltage as the power-side regulator 20.

The overcurrent detection circuit 46 monitors input current at the each path (paths for first intermediate voltages and external sources) via the input terminal 36 immediately before reaching the corresponding supply-side regulator 30. When the overcurrent detection circuit 46 detects that the current value has exceeded a maximum value that can be reached during normal operation, the overcurrent detection circuit 46 outputs a notification signal (a High-level signal, according to the embodiment) giving notification that the supply-side regulator 30 is operating abnormally. The notification signal is outputted to the control circuit 34 of the corresponding supply-side regulator 30, in a manner similar to that described above. The control circuit 34 that has received the notification signal stops the generation of supply voltages as the supply-side regulator 30.

The notification signals from each detection circuit are only outputted while the relevant state is detected. When the output ends, the control circuit 24 of the power-side regulator 20 resumes the switching operation of the MOSFET 22, thereby resuming the generation of first intermediate voltage as the power-side regulator 20. In a similar manner, respective control circuits 34 of the supply-side regulators 30 resume the regulation operation of the bipolar transistor 32, thereby resuming the generation of supply voltages as the supply-side regulators 30.

The adjustment circuit 42 adjusts the voltage value of the supply voltages generated by the supply-side regulators 30 when an instruction sent by an external device is received. The adjustment is performed by transforming the circuit configuration of the respective control circuits 34 of the supply-side regulators 30 based on the instruction. A specific procedure for transforming the circuit configuration is not described here. However, for example, a method such as laser trimming can be used.

Hereafter, embodiments of when the power supply unit 1, configured as described above, is mounted onto the electronic control device 100 will be described.

According to the embodiment, the power supply unit 1 is mounted as a device that supplies power to the electronic control device 100. The power supply unit 1 is configured to generate a plurality of types of voltages required by the microcomputer 200 and the various sensors 300 in the electronic control device 100, and to supply the voltages.

Here, for example, when the microcomputer 200 and the various sensors 300 can be controlled by just the supply voltages determined by the respective characteristics of the power-side regulator 200 and the supply-side regulators 300, as shown in FIG. 2, all input terminals 36, each corresponding to supply-side regulators 30, are merely required to be connected to the path passing through the power-side regulator 20.

Figure 3:
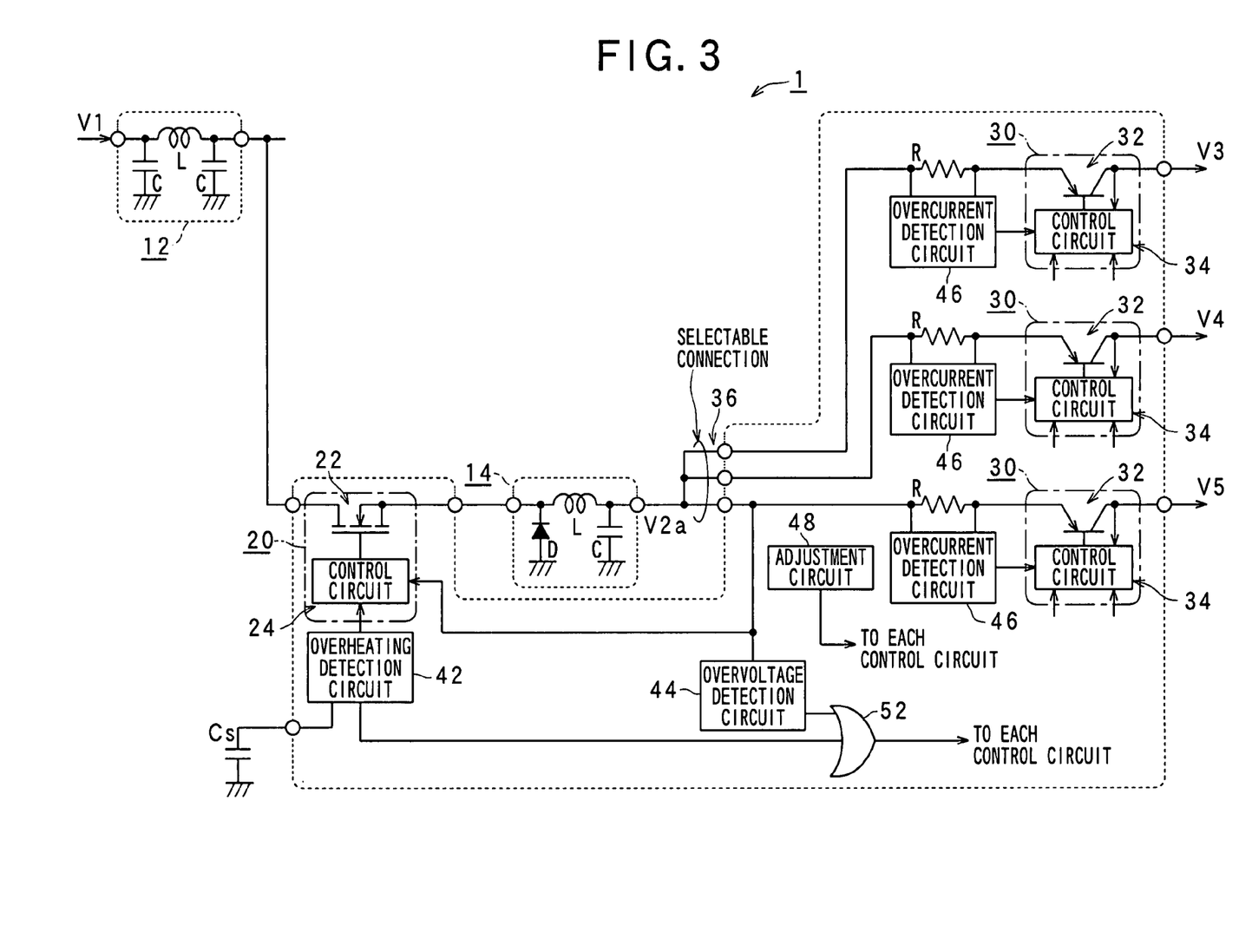
FIG. 3 is a block diagram (2/2) showing a configuration of the power supply unit (first embodiment)

As shown in FIG. 3, in the first embodiment, a soft-start capacitor Cs can be provided, connected to the power-side regulator 20 to soft-start the operation of the power-side regulator 20.

In this instance, when the overheating detection circuit 42 detects overheating in the periphery of the power-side regulator 20, the soft-start capacitor Cs is discharged. As a result, the operation of the power-side regulator 20 is stopped, and the generation of first intermediate voltages is stopped.

Second Embodiment

According to the embodiment, in terms of specifications, the microcomputer 200 and the various sensors 300 may require supply voltages having other voltage values, in addition to the supply voltages determined by the respective characteristics of the power-side regulator 20 and the supply-side regulators 30.

Specifically, for example, among the plurality of types of voltages, one type is a voltage value that differs from the others (the voltage value is greater or smaller). Because the voltage value differs, it cannot be generated merely by combination of the power-side regulator 20 and the supply-side regulators 30. Moreover, even if the voltage can be generated, allowable loss within the IC may be exceeded.

In an instance such as this, an input terminal 36 corresponding to any supply-side regulator 30 is connected to the path that does not pass through the power-side regulator 20. In addition, an external source is inputted from this path, the external source having a voltage value allowing the voltage value that differs to be generated in relation to the characteristics of the supply-side regulator 30.

As an example application, the power supply voltage is stepped-down to have a voltage value differing from that of the first intermediate voltage. This stepped-down second intermediate voltage (referred to third voltage) is inputted into the supply-side regulator 30 via the input terminal 36 as an external source.

Figure 4:
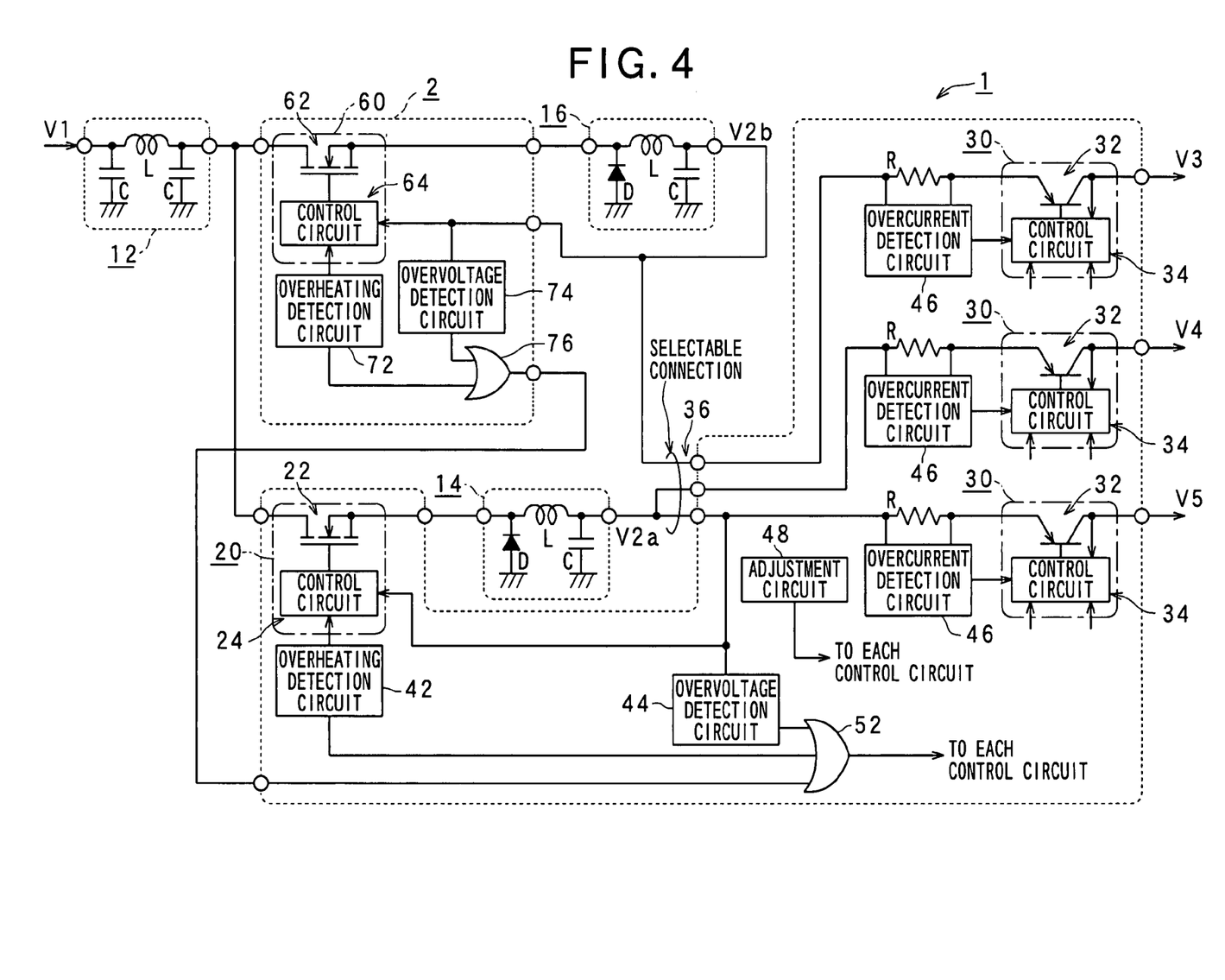
FIG. 4 is a block diagram (1/3) showing a configuration of the power supply unit (second embodiment)

As a specific configuration, for example, as shown in FIG. 4, a configuration further including a general-purpose auxiliary power supply unit 2 and a smoothing circuit 16 can be considered. The auxiliary power supply unit 2 generates the second intermediate voltage that is the power supply voltage from which noise has been removed by the input filter 12 and that has been stepped-down. The smoothing circuit 16 smoothes the second intermediate voltage generated by the auxiliary power supply unit 2.

The auxiliary power supply unit 2 includes an auxiliary regulator 60, an overheating detection circuit 72, an overvoltage detection circuit 74, and the like. The auxiliary regulator 60 generates the second intermediate voltage that is the power supply voltage from which noise has been removed by the input filter 12 and that has been stepped-down. The overheating detection circuit 72 detects the temperature of the auxiliary regulator 60. The overvoltage detection circuit 74 detects the voltage value of the second intermediate voltage smoothed by the smoothing circuit 16. The auxiliary power supply unit 2 is configured to supply the power supply unit 1 with the second intermediate voltages generated by the auxiliary regulator 60.

Among the constituent elements, the auxiliary regulator 60 is a switching regulator including a MOSFET 62, and a control circuit 64 that controls switching of the MOSFET 62. The auxiliary regulator 60 steps down the voltage V1 of the power supply voltage to a midpoint potential V2b by a switching operation of the MOSFET 62, and outputs the stepped-down voltage as the second intermediate voltage. The auxiliary regulator 60 can also be configured as a series regulator, similar to the supply-side regulator 30, if accuracy takes precedence over loss suppression. A voltage value of the v2a and v2b are decided such that the voltage value satisfies a specified input voltage range of the supply-side regulator 30 that allows the regulator to operate normally.

The overheating detection circuit 72 monitors the peripheral temperature of the auxiliary regulator 60. When the overheating detection circuit 42 detects that the temperature has exceeded a maximum temperature that can be reach during a normal operation, the overheating detection circuit 42 outputs a notification signal (a High-level signal, according to the embodiment) giving notification that the auxiliary regulator 60 is operating abnormally. The notification signal is outputted to the power supply unit 1 via an OR circuit 76. The power supply unit 1 receives the signal by the above-described OR circuit 52.

In other words, the notification signal is outputted to the control circuit 34 of each supply-side regulator 30 via the OR circuit 76 and the OR circuit 52. Each control circuit 34 that has received the notification signal stops the generation of supply voltages as the supply-side regulator 30, in a manner similar to that described above.

The overheating detection circuit 72 also outputs the notification signal to the control circuit 64. The control circuit 64 that has received the notification signal stops the switching operation of the MOSFET 62, thereby stopping the generation of supply voltages as the auxiliary regulator 60.

The overvoltage detection circuit 74 monitors the voltage value of the second intermediate voltage that has been smoothed by the smoothing circuit 16. When the overvoltage detection circuit 74 detects that the voltage value has exceeded a maximum value that can be reached while the auxiliary regulator 60 is operating normally, the overvoltage detection circuit 74 outputs a notification signal (a High-level signal according to the embodiment) giving notification that the auxiliary regulator 60 is operating abnormally. The notification signal is outputted to the control circuit 34 of each supply-side regulator 30 via the OR circuit 76 and the OR circuit 52, in a manner similar to that described above. Each control circuit 34 that has received the notification signal stops the generation of supply voltages as the supply-side regulator 30, in a manner similar to that described above.

The overvoltage detection circuit 74 also outputs the notification signal to the control circuit 64. The control circuit 64 that has received the notification signal stops the switching operation of the MOSFET 62, thereby stopping the generation of supply voltages by the auxiliary regulator 60.

Figure 5:
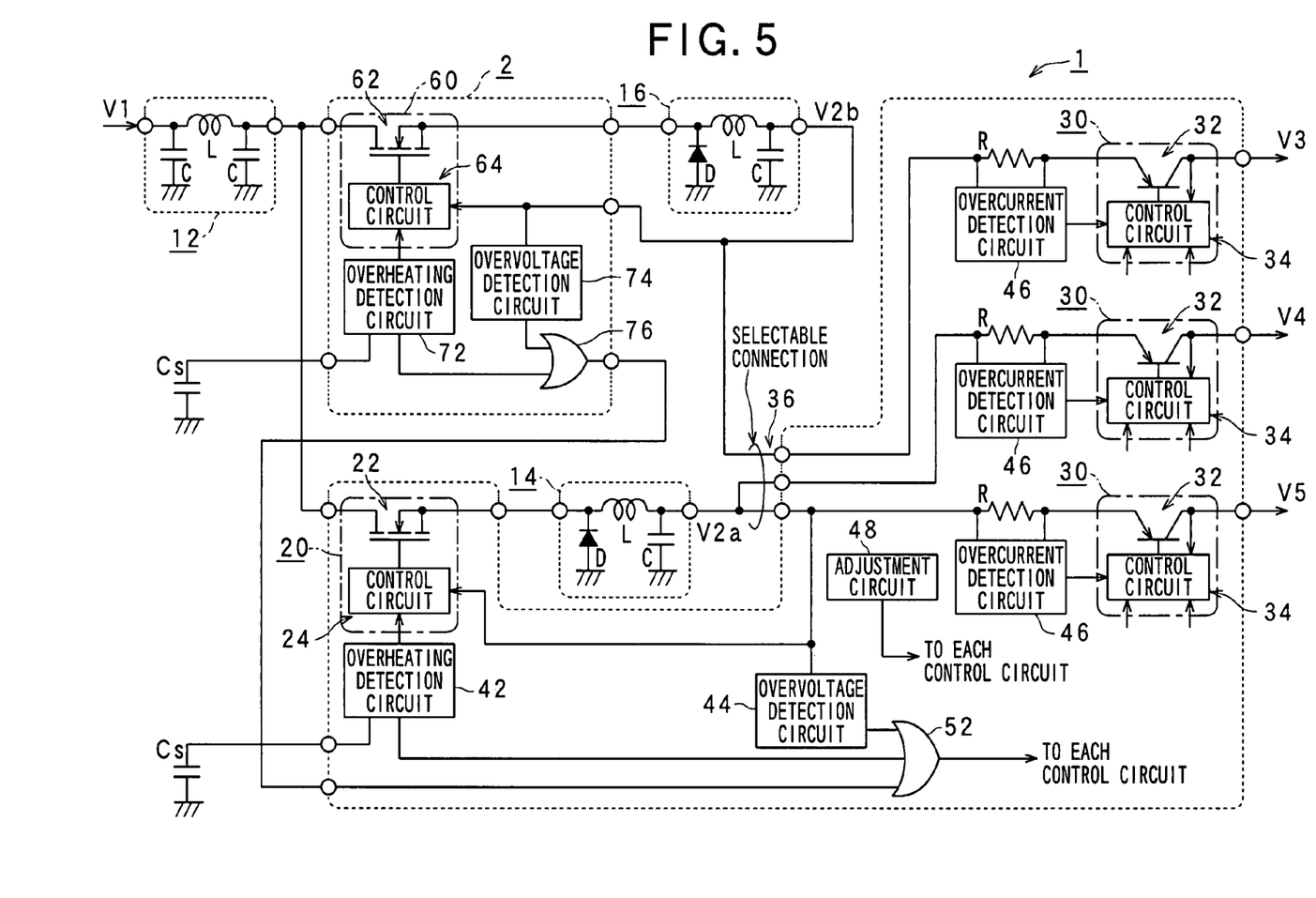
FIG. 5 is a block diagram (2/3) showing a configuration of the power supply unit (second embodiment)
Figure 6:
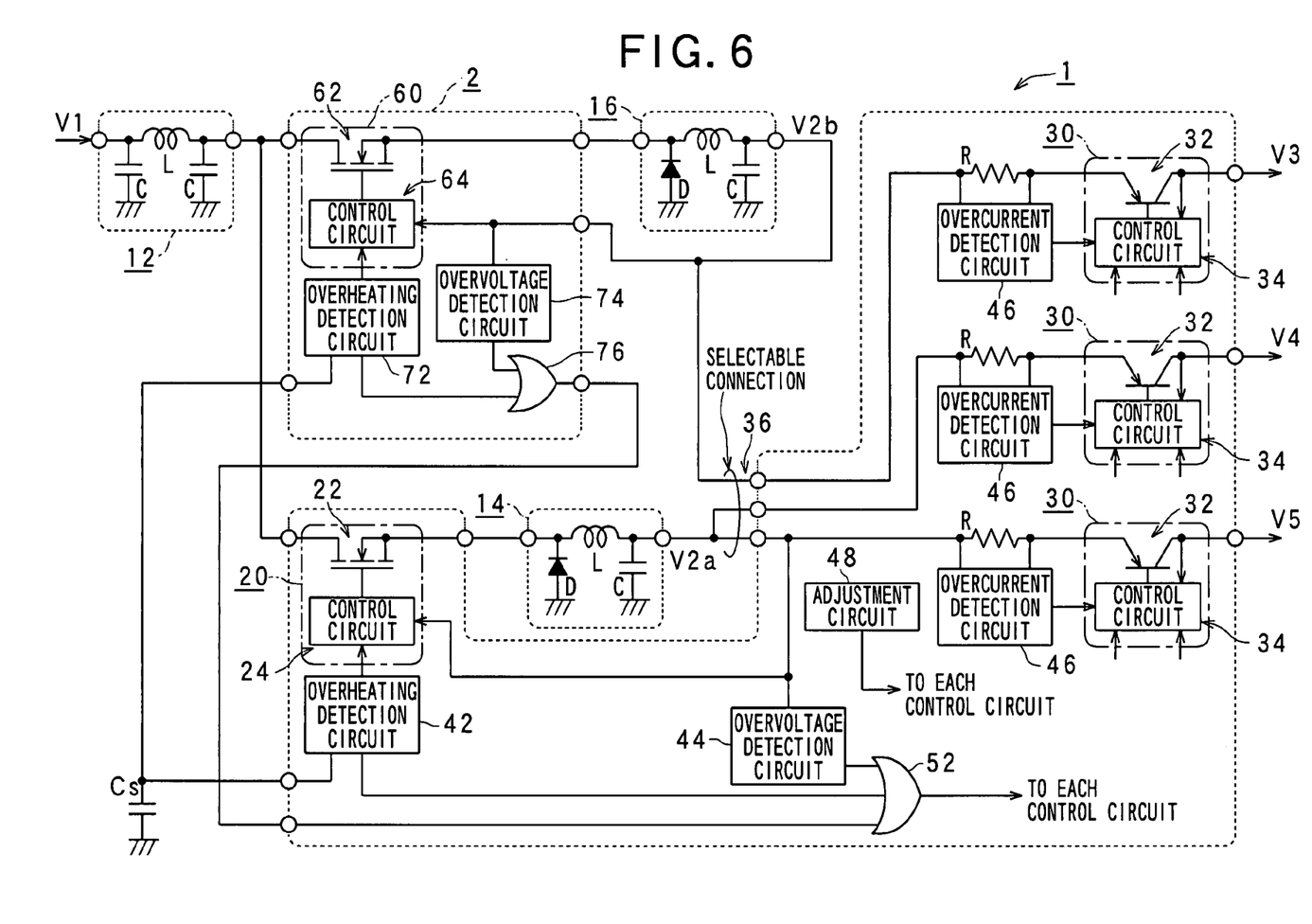
FIG. 6 is a block diagram (3/3) showing a configuration of the power supply unit (second embodiment)

In the second embodiment, as shown in FIG. 3, a soft-start capacitor Cs can be provided, connected to the power-side regulator 20 and the auxiliary regulator 60 such as to soft-start the operations of the power-side regulator 20 and the auxiliary regulator 60. As shown in FIG. 5, a separate soft-start capacitor Cs can be provided for each regulator. Preferably, as shown in FIG. 6, the soft-start capacitor Cs is connected in parallel to both regulators.

In this instance, when the overheating detection circuit 42 and the overheating detection circuit 72 respectively detect overheating in the periphery of the power-side regulator 20 and the auxiliary regulator 60, the soft-start capacitor Cs is discharged. As a result, the operation of the relevant regulator can be stopped, and the generation of first intermediate voltages and second intermediate voltages can be stopped.

In the power supply unit 1 configured as described above, the input terminal 36 is connected to a path such that the first intermediate voltage from the power-side regulator 20 or another external source that does not pass through the power-side regulator 20 is selectively inputted into at least any of the supply-side regulators 30. As a result, the supply voltage can be generated based on this configuration.

Therefore, as a result of a path to which the other external source is inputted being connected to the relevant supply-side regulator 30, a supply voltage can be generated that has a voltage value differing from that when the first intermediate voltage is inputted.

As a result of the voltage inputted into the relevant supply-side regulator 30 being changed from the first intermediate voltage to the external source in this way, only the voltage value of the supply voltage generated by the supply-side regulator 30 is changed. Therefore, the output voltage range of the power supply unit 1 can be changed.

Such changes can be easily achieved merely through selective connection of the relevant supply-side regulator 30 to either the path from the power-side regulator 20 or the path that does not pass through the power-side regulator 20, based on the voltage value required by the controlled object (electronic control device 100).

According to the embodiment, when the controlled object can be controlled by just the supply voltage determined by the respective characteristics of the power-side regulator 20 and the supply-side regulators 30, as described in the first embodiment, the power supply unit 1 is mounted such that all supply-side regulators 30 are connected to the path from the power-side regulator 20 (FIG. 2 and FIG. 3).

On the other hand, when the controlled object requires a supply voltage having a different voltage value in addition to the supply voltage determined by the respective characteristics of the power-side regulator 20 and the supply-side regulators 30, the power supply unit 1 is mounted such that any of the supply-side regulators 30 is connected to the path that does not pass through power-side regulator 20 and, in addition, the external source is inputted from the path, the external source having a voltage value allowing the voltage value that differs to be generated in relation to the characteristics of the supply-side regulator 30.

Specifically, as described in the second embodiment, the auxiliary regulator 60 (auxiliary power supply unit 2) is additionally provided that generates the second intermediate voltage that is the power supply voltage that has been stepped-down. The second intermediate voltage generated in this way is inputted into the supply-side regulator 30 as the external source (FIG. 4 to FIG. 6).

In this way, as a result of the general-purpose auxiliary power supply unit 2 being added, a supply voltage of a variation required for control can be generated depending on the controlled object, with the power supply unit 1 as is. Therefore, an extra dedicated power supply unit is not required. As a result, an increase in the final manufacturing cost of the controlled object, including design and manufacturing, can be prevented. Such cost-related advantages are particularly significant in small-scale manufacturing of multiple types of mounting objects.

According to the embodiment, when an abnormality occurs in the power-side regulator 20, the generation of supply voltages by the supply-side regulators 30 provided further downstream can be stopped. As a result, abnormal supply voltages are promptly prevented from being supplied to the controlled object.

According to the embodiment, the overheating detection circuit 42 can detect an abnormal operation based on temperature rise in the power-side regulator 20.

According to the embodiment, the overvoltage detection circuit 44 can detect an abnormal operation based on the output voltage of the power-side regulator 20.

According to the embodiment, the overcurrent detection circuit 46 can detect an abnormal operation based on the output current of the power-side regulator 20.

According to the embodiment, the notification signal from each detection circuit is supplied to the control circuit 34 of each supply-side regulator 30 via the OR circuit 52. Therefore, abnormal operation can be detected based on any of the temperature rise in the power-side regulator 20, the voltage value of the first intermediate voltage, and the current value of the first intermediate voltage.

According to the embodiment, the adjustment circuit 48 can adjust the voltage value of the supply voltage generated by each supply-side regulator 30 within a range determined in relation to the voltage value of the first intermediate voltage.

In a configuration in which the power-side regulator 20 is provided with a soft-start capacitor Cs (FIG. 3, FIG. 5, and FIG. 6), generation of first intermediate voltages by the power-side regulator 20 can be stopped as a result of the soft-start capacitor Cs being discharged.

In a configuration in which the soft-start capacitor Cs provided to the power-side regulator 20 is also used as the soft-start capacitor of the auxiliary regulator 60 in the auxiliary power supply unit 2 (FIG. 6), the number of soft-start capacitors Cs can be reduced, compared to when separate capacitors are used.

As a result of the soft-start capacitor Cs being discharged, the generation of second intermediate voltages by the auxiliary regulator 60 of the auxiliary power supply unit 2 can be stopped simultaneously with the generation of first intermediate voltages by the power-side regulator 20.

As a result, abnormal operation of a regulator on one side can be detected by a regulator on the other side, and the generation of intermediate voltages can be stopped. From the perspective of the regulator on one side, discharge of the soft-start capacitor Cs in a state in which an abnormal operation of the regulator itself is not detected can be considered to be caused by an abnormal operation of the regulator on the other side.

According to the embodiment, even when the auxiliary power supply unit 2 is added, an abnormal operation of the auxiliary regulator 60 is detected by the detection circuits on the auxiliary power supply unit 2 side, and notification of the detection result is made to the power supply unit 1 side. Therefore, the power supply unit 1 side can detect the occurrence of abnormality, and the generation of first intermediate voltages by the power-side regulator 20 and the generation of supply voltages by the supply-side regulators 30 can be stopped.

In the configuration, when abnormal operation of the auxiliary regulator 60 occurs, the generation of supply voltages by a supply-side regulator 30 provided furthest downstream can be stopped. As a result, abnormal supply voltages can be promptly prevented from being supplied to the controlled object.

Other Embodiment

An embodiment of the present invention is described above. However, the present invention is not limited in any way to the above-described embodiment. Various modifications can be made without departing from the technical scope of the present invention.

For example, according to the embodiment, when an abnormal operation of the power-side regulator 20 is detected, all supply-side regulators 30 stop generating the supply voltages. However, not all supply-side regulators 30 are required to stop generating the supply voltages in this way. For example, only one or more supply-side regulator 30, determined based on the importance of the function provided by the controlled object and actualized by the supply voltage, may be required to stop.

Figure 7:
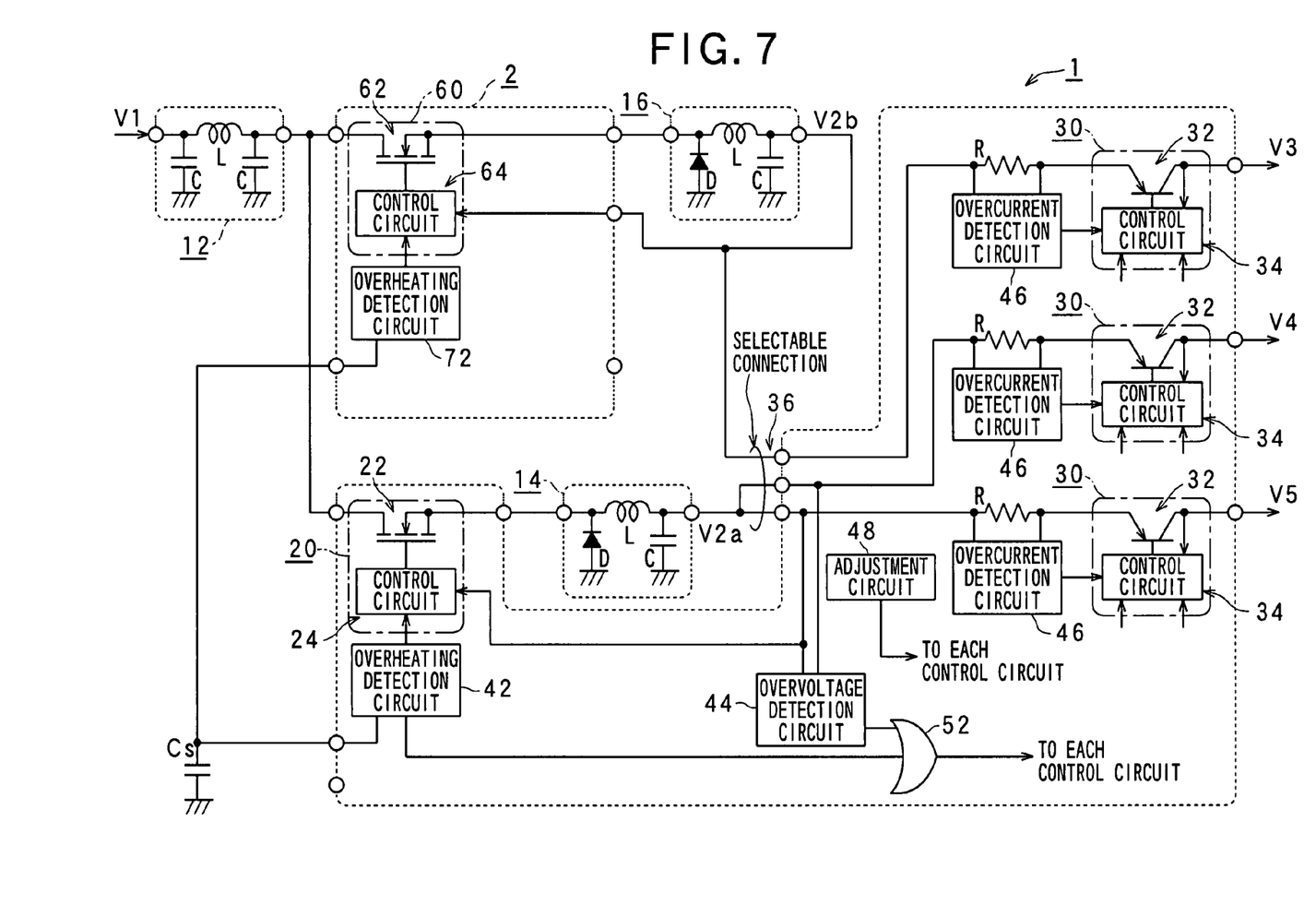
FIG. 7 is a block diagram showing a configuration of a power supply unit according to other embodiment.

In the second embodiment, when a common soft-start capacitor Cs is provided for the power-side regulator 20 and the supply-side regulators 30, as shown in FIG. 7, the second intermediate voltage smoothed by the smoothing circuit 16 can be inputted into the overvoltage detection circuit 44 of the power supply unit 1 midway on the path leading to the supply-side regulator 30. The overvoltage detection circuit 44 can detect the overvoltage on the auxiliary power supply unit 2 side.

As described above, the power-side regulator 20 can detect abnormal operation of the auxiliary regulator 60 of the auxiliary power supply unit 2 based on the discharge state of the soft-start capacitor Cs. Therefore, a path for notifying abnormal operation of the auxiliary regulator 60 is not required.

As a result, an abnormal operation on the auxiliary regulator 60 side can be detected by the power-side regulator 20 side of the power supply unit 1, and the generation of intermediate voltages can be stopped.

A path is merely required to be formed within the power supply unit 1 to connect the overvoltage detection circuit 44 with the path leading the second intermediate voltage to the supply-side regulators 30. Therefore, a signal path (a signal path connecting the OR circuit 76 and the power supply unit 1 in FIG. 6) connecting the auxiliary power supply unit 2 and the power supply unit 1 can be omitted.

According to the embodiment, the control circuit of each regulator stops the generation of voltages when a detection circuit detects an abnormal operation or, in other words, while a notification signal is outputted. In other words, the generation of voltages is resumed when the notification signal is no longer outputted from the detection circuit.

The generation of voltages can be resumed immediately after output of the notification signals stops. Alternatively, the generation of voltages can be resumed after elapse of a certain period of time. Specifically, for example, in a configuration in which the operation of the controlled object is reset when a detection circuit detects an abnormal operation, the generation of voltages can be resumed after elapse of an amount of time required to reset the operation of the controlled object after the detection circuit detects the abnormal operation.

Figure 8A:
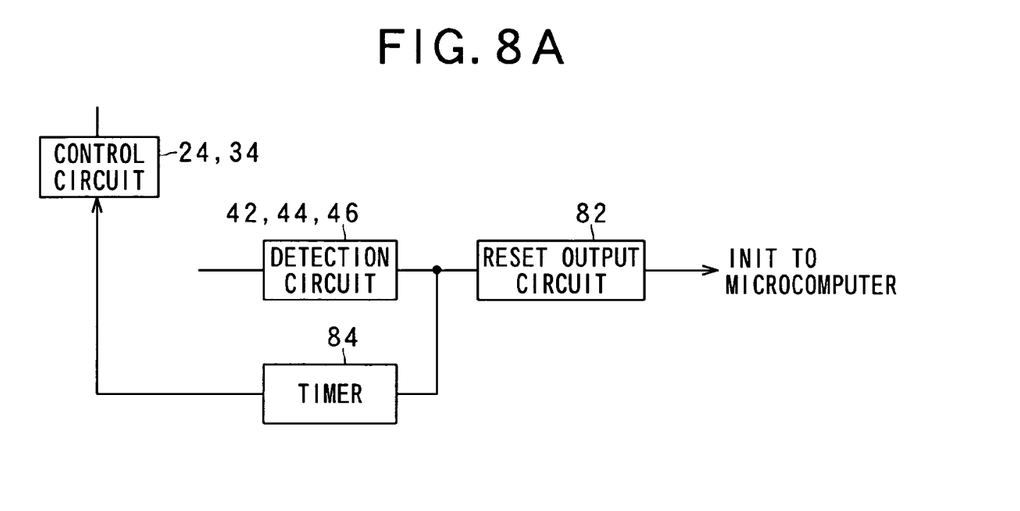
FIGS. 8A and 8B are a block diagram showing a configuration of a power supply unit according to other embodiment.

As a configuration for resuming the generation of voltages after elapse of a certain period of time, for example, as shown in FIG. 8A, a reset output circuit 82 and a timer 84 are provided. The reset output circuit 82 outputs a reset signal based on a notification signal from a detection circuit. The timer 84 counts an amount of time elapsed from when the notification signal is outputted. The generation of voltages by the regulators is resumed when the detection circuit no longer outputs the notification signal and when the counter value of the timer 84 corresponds to the required amount of time or more.

In the configuration, even when the abnormal operation is no longer detected and the notification signal is no longer outputted, the generation of voltages is not resumed until a reset period (i.e., necessary time for reset) has elapsed to reset the operation of the controlled object. As a result, even when abnormal operation occurs for only a period of time shorter than the reset period of the controlled object, the generation of voltages is resumed after the reset period has elapsed. Therefore, the supply of voltages to the regulators can be resumed after the reset of the controlled object has been completed.

Figure 8B:
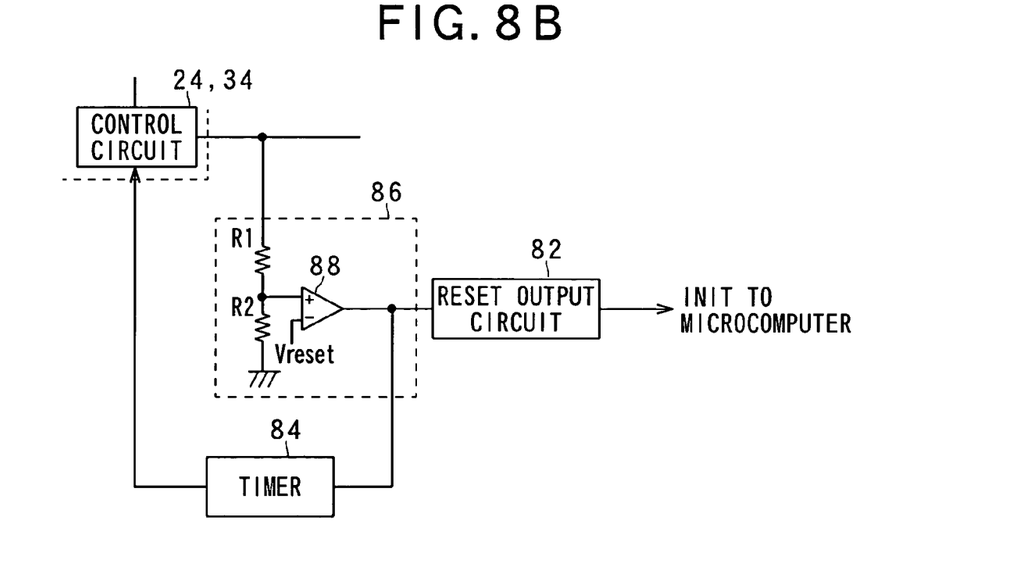

A circuit configuration other than those described above can be used as the detection circuit in this configuration. Specifically, as shown in FIG. 8B, a circuit configuration can be considered in which the voltage of a voltage generated by a regulator is detected by a comparator 88 as a value of a voltage divided by a resistor R1 and a resistor R2. A notification signal can be outputted to the reset output circuit 82 as a result of the voltage being less than a certain value.

Figure 9:
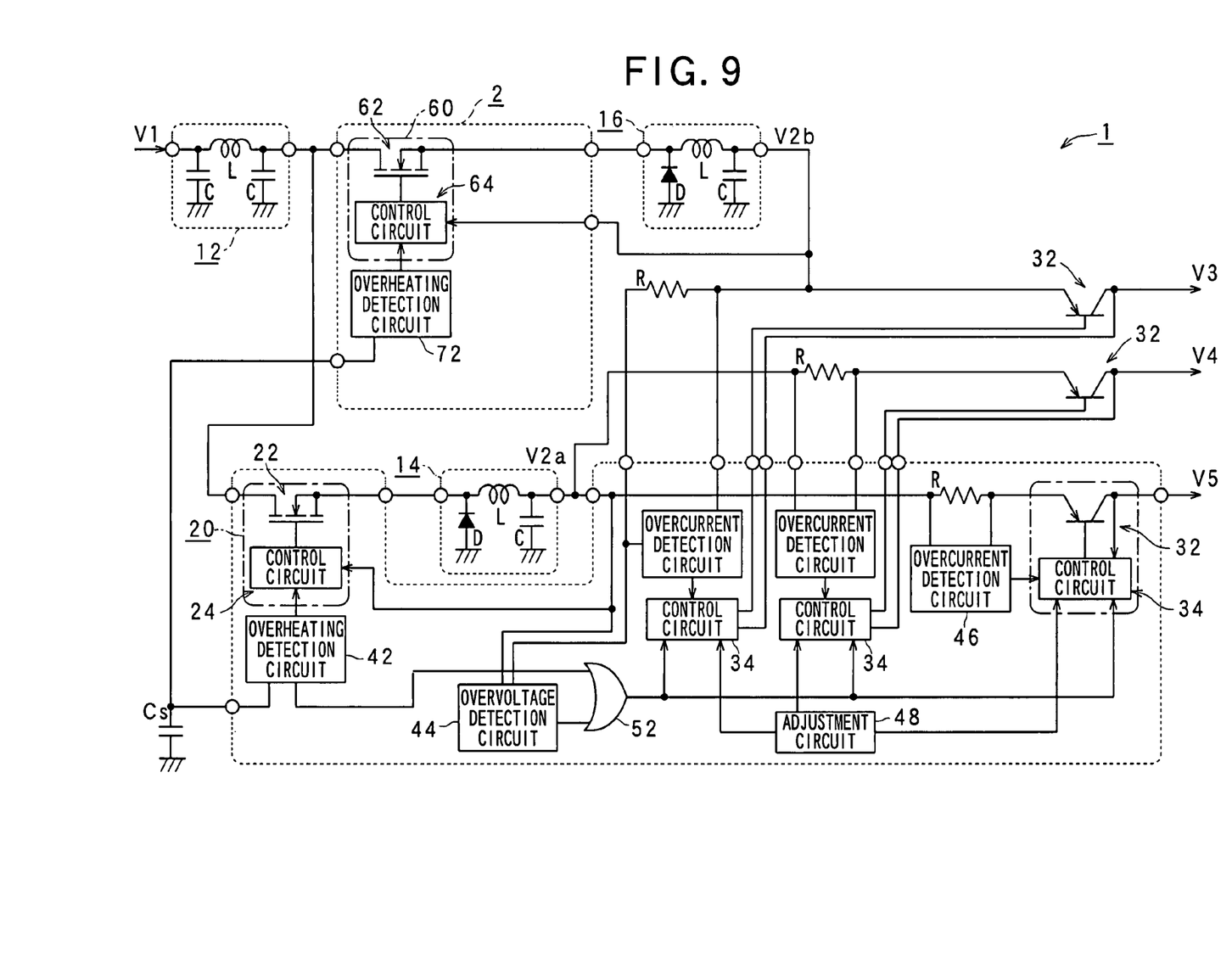
FIG. 9 is a block diagram showing a configuration of a power supply unit according to other embodiment.

According to the above-described embodiment, a configuration is given in which the constituent elements of the power supply unit 1, excluding the input filter 12 and the smoothing circuit 14, are mounted as a single IC. However, the power supply unit 1 can be configured such that the other constituent elements are not integrated into a single IC. For example, as shown in FIG. 9, some of the bipolar transistors 32 of the supply-side regulators 30 can be provided externally.

According to the above-described embodiment, the overheating detection circuit 42, the overvoltage detection circuit 44, the overcurrent detection circuit 46, the OR circuit 52, and the soft-start capacitor Cs form a first abnormality detecting section of the present invention. The adjustment circuit 48 is a voltage adjusting section of the present invention. The overheating detection circuit 72, the overvoltage detection circuit 74, the OR circuit 76, and the soft-start capacitor Cs of the auxiliary power supply unit 2 form a second abnormality detecting section of the present invention.

What is claimed is:

1. A power supply unit supplying an object device with a regulated voltage, comprising:
   a first regulator that generates a first voltage that is stepped-down voltage from a power source;
   one or more second regulators each generates a second voltage that is stepped-down voltage from the first voltage, and supply the object device with the second voltage as the regulated voltage;
   a first path through which the first voltage is inputted from the first regulator;
   a second path that is different from the first path and allows input of an external source; and
   a first abnormality detecting section that detects abnormal operation of the first regulator, wherein
   at least one of the second regulators is configured to allow selective connection to either of the first path and the second path, and the second voltage is generated based on the source from the selectively connected path, and the first regulator is configured to stop generating the first voltage when the first abnormality detecting section detects abnormal operation.

2. The power supply unit according to claim 1, further comprising:
   a soft-start capacitor connected to the first regulator to soft-start the operation of the first regulator, wherein
   when the first abnormality detecting section detects abnormal operation, the first regulator stops operation of the first regulator by discharging the soft-start capacitor, thereby stops generating the first voltage.

3. The power supply unit according to claim 2, wherein:
   when an auxiliary power supply unit is provided, and the auxiliary power supply unit includes an auxiliary regulator that generates a third voltage being stepped-down from the power source to a voltage value differing from that of the first voltage and a second abnormality detecting section that detects an abnormal operation of the auxiliary regulator, and configured such that, when the second abnormality detecting section detects an abnormal operation, a soft-start capacitor provided to soft-start the operation of the auxiliary regulator is discharged, thereby the auxiliary regulator stops operation,
   the soft-start capacitor is connected in parallel to the first regulator and the auxiliary regulator in the auxiliary power supply unit to soft-start the operation of the auxiliary regulator in addition to the operation of the first regulator.

4. The power supply unit according to claim 1, further comprising:
   a reset output section that outputs a reset signal for resetting an operation of the controlled object to the controlled object to which the second voltage is supplied, while the first abnormality detecting section is detecting an abnormal operation, wherein
   the first regulator resumes generating the first voltage after elapse of a predetermined amount of time required to reset the operation of the controlled object after the first abnormality detecting section stops detecting the abnormal operation.

5. A power supply unit supplying an object device with a regulated voltage, comprising:
   a first regulator that generates a first voltage that is stepped-down voltage from a power source;
   one or more second regulators that each generate a second voltage that is stepped-down voltage from the first voltage, and supply the object device with respective second voltages as the regulated voltage; and
   a first abnormality detecting section that detects an abnormal operation of the first regulator,
   wherein at least one of the second regulators is configured to allow selective connection to either of a first path through which the first voltage is inputted from the first regulator and a second path that is different from the first path and allows input of an external source, and the second voltage is generated based on the source from the selectively connected path,
   when the first abnormality detecting section detects the abnormal operation, at least any of the second regulators stops generating the second voltage,
   when an auxiliary power supply unit is provided, the auxiliary power supply unit including an auxiliary regulator that generates a third voltage that is the power source stepped-down to a voltage value differing from that of the first voltage and a second abnormality detecting section that detects an abnormal operation of the auxiliary regulator, and
   when a detection signal inputted from at least either of a first detection path and a second detection path indicates a detection result that an abnormal operation has been detected, at least any of the second regulators stops generating the second voltage, the first detection path inputting a detection signal from the first abnormality detecting section and the second detection path inputting a detection signal from the second abnormality detecting section of the auxiliary power supply unit.

6. The power supply unit according to claim 5, wherein the first abnormality detecting section is configured as a detection circuit that detects an abnormal operation of the first regulator by a temperature rise accompanying the generation of the first voltage by the first regulator exceeding a predetermined threshold value.

7. The power supply unit according to claim 5, wherein the first abnormality detecting section is configured as a detection circuit that detects an abnormal operation of the first regulator by a voltage value of the first voltage generated by the first regulator becoming greater than a predetermined threshold value.

8. The power supply unit according to claim 5, wherein the first abnormality detecting section is configured as a detection circuit that detects an abnormal operation of the second regulator by a current value of the first voltage generated by the first regulator becoming greater than a predetermined threshold value.

9. The power supply unit according to claim 5, wherein the first abnormality detecting section is configured as a detection circuit that detects an abnormal operation of the first regulator or the second regulators by at least any of a temperature rise accompanying the generation of the first voltage by the first regulator exceeding a predetermined threshold value, a voltage value of the first voltage generated by the first regulator becoming greater than a predetermined threshold value, and a current value of the first voltage generated by the first regulator becoming greater than a predetermined threshold value.

10. The power supply unit according to claim 9, further comprising:
    a reset output section that outputs a reset signal for resetting an operation of the controlled object to the controlled object to which the second voltage is supplied, while the first abnormality detecting section is detecting an abnormal operation, wherein
    each second regulator resumes generating the second voltage after elapse of a predetermined amount of time required to reset the operation of the controlled object after the first abnormality detecting section stops detecting the abnormal operation.

11. The power supply unit according to claim 1, further comprising:
a voltage adjusting section for adjusting a voltage value of the second voltage generated by each second regulator in respond to an instruction sent by an external device.

12. A power supply unit supplying an object device with a regulated voltage, comprising:
a first regulator that generates a first voltage that is stepped-down voltage from a power source;
a plurality of second regulators each generates a second voltage that is stepped-down voltage from the first voltage, and supply the object device with the second voltage as the regulated voltage, the second voltages generated by the second regulators being different from each other;
a first path through which the first voltage is inputted from the first regulator; and
a second path that is different from the first path and allows input of an external source,
wherein the first regulator and at least one of second regulators are integrated as an integrated circuit including an output terminal from which the first voltage is outputted outside the integrated circuit and an input terminal connected to any of the second regulators,
the input terminal is capable of selectively connecting either the first path being connected to the output terminal or the second path, and the second regulators being connected to the input terminal generates the second voltage based on either the first voltage or a voltage of the external source.

13. The power supply unit according to claim 12, wherein the power supply unit includes an auxiliary power unit including an auxiliary regulator that generates a third voltage being stepped-down from the power source to a voltage value differing from that of the first voltage,
the input terminal is capable of selectively connecting either the first path or a third path through which the third voltage is inputted and being different from the first and second paths, and the second regulators being connected to the input terminal generates the second voltage based on either the first voltage or the third voltage.

14. The power supply unit according to claim 12, further comprising:
a first abnormality detecting section that detects abnormal operation of the first regulator, wherein
when the first abnormality detecting section detects abnormal operation, the first regulator stops generating the first voltage.

15. The power supply unit according to claim 13, further comprising:
a first abnormality detecting section that detects abnormal operation of the first regulator, wherein
when the first abnormality detecting section detects abnormal operation, the first regulator stops generating the first voltage.

16. The power supply unit according to claim 14, further comprising:
a soft-start capacitor connected to the first regulator to soft-start the operation of the first regulator, wherein
when the first abnormality detecting section detects abnormal operation, the first regulator stops operation of the first regulator by discharging the soft-start capacitor, thereby stops generating the first voltage.

17. The power supply unit according to claim 16, wherein:
when an auxiliary power supply unit is provided, and the auxiliary power supply unit includes an auxiliary regulator that generates a third voltage being stepped-down from the power source to a voltage value differing from that of the first voltage and a second abnormality detecting section that detects an abnormal operation of the auxiliary regulator, and configured such that, when the second abnormality detecting section detects an abnormal operation, a soft-start capacitor provided to soft-start the operation of the auxiliary regulator is discharged, thereby the auxiliary regulator stops operation,
the soft-start capacitor is connected in parallel to the first regulator and the auxiliary regulator in the auxiliary power supply unit to soft-start the operation of the auxiliary regulator in addition to the operation of the first regulator.

18. The power supply unit according to claim 12, further comprising:
a reset output section that outputs a reset signal for resetting an operation of the controlled object to the controlled object to which the second voltage is supplied, while the first abnormality detecting section is detecting an abnormal operation, wherein
the first regulator resumes generating the first voltage after elapse of a predetermined amount of time required to reset the operation of the controlled object after the first abnormality detecting section stops detecting the abnormal operation.

* * * * *